Jan. 24, 1961    J. R. BUNCE, JR., ET AL    2,969,219
VALVE SEAT

Filed June 14, 1956    2 Sheets-Sheet 1

Edwin J. Geu    INVENTORS
Jerome R. Bunce, Jr.

BY
Atty.

Jan. 24, 1961 J. R. BUNCE, JR., ET AL 2,969,219
VALVE SEAT
Filed June 14, 1956 2 Sheets-Sheet 2

Edwin J. Geu INVENTORS
Jerome R. Bunce, Jr.
BY
Atty.

United States Patent Office 2,969,219
Patented Jan. 24, 1961

2,969,219

VALVE SEAT

Jerome R. Bunce, Jr., Wauconda, and Edwin J. Geu, Norwood Park Township, Cook County, Ill., assignors to The Bastian-Blessing Company, Chicago, Ill., a corporation of Illinois Filed June 14, 1956, Ser. No. 591,337

2 Claims. (Cl. 251—362)

This invention relates to a high-pressure regulator and more particularly to an improved valve seat for an oxygen high-pressure regulator having a nozzle type valve port.

One of the problems in valve mechanisms for use in high-pressure regulators is the fact that the valve seat normally tends to distort under heavy closing conditions so that for example, where a diaphragm is used and the amount of movement of the valve seat support is limited, the valve can quickly become inoperable or loses its initial calibration.

Another problem is to provide a valve seat which will be sufficiently tough, yet have a smooth planar closing surface which will close square against the valve nozzle with even pressure over its entire area and will hold its shape after being subjected to closing pressures repeatedly.

It has been found that nylon provides the resistance to cold flow which is desirable to maintain the effectiveness of the valve. However, previous attempts to use this material have met with some difficulty in that the solid and liquid phase temperatures for the nylon are substantially identical so that the hardening process in molding the seat takes place very rapidly with some consequent distortion in the final product.

Heretofore, where machining operations were employed to perfect the finish and tolerance of the outer surfaces of a nylon seat, it was found that an unexpected result occurred in that the heat of abrasion hardens the walls so that the surface resiliency of nylon is reduced and the hardened finish stands up much longer to the valve nozzle contact. However, the sealing characteristic was not satisfactory because of concentric tool marks which augmented seat ignition.

It is therefore, an object of the present invention to provide a high-pressure oxygen regulator having a nylon valve seat which is of reduced axial thickness in its central portion with respect to its overall dimensions and heat treated to provide a hardened work surface. Preferably, a hollow cored construction is provided so that the seat can be molded with negligible distortion and with a mirror finish on its working face. This provides a molding skin and a smoothness of contact on the working face of the valve seat which remains planar under closing pressures.

Another object of the invention is to provide a high-pressure oxygen regulator wherein the valve seat is of integral nylon of the hollow cored construction disclosed herein with the core parting line enclosed in supporting parts of the valve construction when in use so that the flashing produced by the coring operating is kept away from oxygen flow to minimize the danger of ignition. In this connection, it has been found that with a mirror hardened surface nylon is practically completely resistant to ignition, even where the supply of oxygen is suddenly opened to permit the rush of oxygen against the closed seat under adverse conditions.

Another object of the invention is to utilize the hollow cored nylon seat in a valve having a nozzle construction which eliminates in the combination the possibility of ignition as compared with more conventional systems of metering oxygen.

Another object is to provide a cross-sectional configuration of the valve seat wherein the sides defining the peripheral valve seat are relatively slightly elongated relative to the central portion and the upper face of the valve seat conforms with the rounded valve opening over a relatively large area of engagement.

A further object of the invention is to provide an improved fastening for holding the hollow cored seat in sealed relation marginally around the cored portion and the working face to eliminate seepage of gas under pressure into the cavity defined by the core.

Other objects and advantages of the invention will appear from the following description taken in connection with the accompanying drawings, in which.

Figure 1:
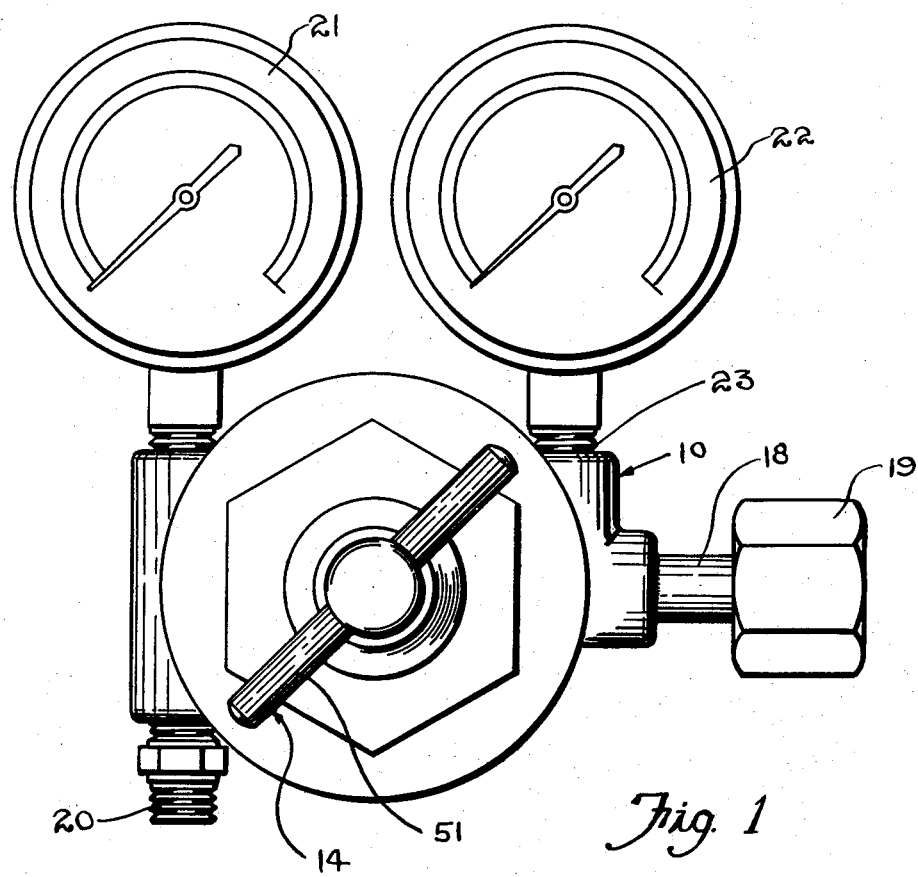
Fig. 1 is a top plan view of an oxygen high-pressure regulator according to the invention.

In dispensing gases under high pressures, it is desirable to use a valve seat of comparatively hard material for the reason that the high pressure of the gas requires considerable closing force to be applied on the valve to close the same tight enough to prevent leakage. These forces tend to permanently distort conventional valve seat members if resilient or the valve port seat or both, if the material is hard. However, because substantial resiliency has been needed heretofore for sealing purposes most materials are subject to permanent deformation of an amount which creates permanent decalibration or otherwise renders the operation of the valve unsatisfactory.

Some materials cannot be used safely with certain gases (for example, oxygen) because of the ready oxidation produced and the fact that the hard elastomers are frequently subject to sulphur blooming and scuffing. If oxygen gas under high pressure is turned on suddenly in considerable volume with a rubber composition seat, seat ignition or even an explosion is likely to occur due to the rapid union between the hot compressed oxygen and the rubber or of the rubber and free sulphur on or within the valve seat material. In this event, the hard rubber will not only be melted but will be entirely consumed. Again Bakelite is so hard that at high pressures it can distort or flatten the valve port if this is made of brass as is preferably the case for heat conduction, particularly if the valve happens to chatter. If sulphide gases are dispensed, or their flow regulated, it has heretofore been considered necessary to employ chemically pure zinc as the valve seat material.

Under certain other conditions, if the gas is to be dispensed at an elevated temperature, then at such temperatures valve seats of rubber or certain thermo plastics will become soft and the distortion on closing the valve will be such as to render the material unsuited for further continued use.

Sometimes the conditions are reversed and the temperatures are so low that hard rubber or certain plastics materials cannot be used because they become harder and brittle which, with chattering in a valve such as a high-pressure regulator, will cause a crumbling of the material, particularly if the gas handled is carbon dioxide. Again, in the type of valve employing diaphragms as seals and which are flexed for operating the valve, it is necessary that the valve head, or movable member of the valve that is operated by the flexing of the diaphragm have a very limited movement, as otherwise the diaphragm may be ruptured in closing the valve. For that reason, material having a low resistance to cold flow and creep cannot be used for valve seats in valves having limited movement because if the valve seat has a low resistance to cold flow, the movable member will in a short time reach its limit of closing movement and soon thereafter the valve seat will not engage the valve nozzle or seat with the same efficiency in closing the nozzle, or the diaphragm may be ruptured and the parts dislocated.

A valve seat of universal application should be of a material that is firm at all expected working pressures to be applied to it and at all temperatures of ordinary use; but not so hard at low temperatures as to cause shattering or cracking and powdering of the valve seat and not so soft under high temperatures as to be easily distorted. Such valve seats should be non-inflammable, have a high resistance to distortion, creep and cold flow and should be chemically neutral to the gases with which the valve is used. Furthermore, the valve seat should not powder under heavy load at low temperatures in closing the valve, nor be too plastic at higher temperatures. Some materials possess some of these characteristics and others have certain other of the characteristics but no material heretofore used has all of the desired characteristics, not even nylon. However, the valve seat of the present invention not only fulfills the requirements of the long-sought-for valve seat for all types of use, but can be molded to provide a particularly mirror smooth outer surface which is neither too hard nor too brittle and is entirely free from microscopic pitting otherwise due to steam bubbles as cooling shrinkage occurs in the mold.

The nylon valve seat or disc of the present invention has a hollow cored construction which reduces the thickness of the seat relative to its overall dimensions. When the nylon of which the valve seat is made hardens in the molding process, as happens very quickly, the amount of distortion produced is therefore minimized, there being less stock to shrink and less moisture to escape. At the same time, it has been found that by heating the valve at approximately 160° F. ±15° for a relatively long period of time, i.e., from four hours to several days, the hardness is increased from 82 Shore D to 85 Shore D, so that the excessive resilience experienced with some rubber valve seats is avoided and the mirror surface attained in the molding is preserved. Preferably, the ratio of dimensions should be, the thickness of the main portion should be approximately ⅔ of the overall height or ⅓ of the diameter with the radial thickness of the annular flange portion approximately ½ of the radius.

A factor in using valve seats of other than simple cylindrical shape is the fact that the flashing which results from the shaping process as it is generally accomplished, tends to ignite. Accordingly, the cored portion of the valve seat of the present invention opens toward the supporting structure for the seat thereby maintaining the flashing materials out of contact with the flowing oxygen or other gas.

Also, as a result of continuous experiments extending over many months, it has been found that the nylon material as used for the valve of the present invention will prevent ignition to an unexpected extent. Thus, the material employed is a synthetic fibre forming polymeric ammide having a protein-like chemical structure characterized by extreme toughness and strength and the peculiar ability to be formed into fibers and into various shapes.

Nylon is a generic chemical term including several compounds, having a high melting point (about 473° F.) and a high specific heat. This material therefore is admirably adapted for valve seats for gas dispensing valves. It is surprising to see the differences in results from rubber wherein a gram of rubber absorbs 19.14 calories when heated from room temperature to its melting point while a gram of nylon will absorb 122.65 calories under a like condition. In other words, nylon's ability to absorb six times the amount of heat that hard rubber does between room temperature and its respective melting point practically eliminates flash backs when the nylon seat is clean of contaminates. In the present use for the nylon seat in an oxygen regulator, this is extremely important.

The valve seat of the present invention may also be usefully employed with refrigerants such as Freon 12 (dichlorodifluoromethane $C_{12}F_2$) and other refrigerants, carbon dioxide, air, hydrogen and liquefied petroleum gas, as well as sulphide gases. Hydrogen sulphide has been undergoing tests against the seat for over three months, at the end of which time the seat was still in good condition. It was found that nylon, contrary to expectation in view of the fact that other synthetic resins are more or less inflammable, does not burn when provided with a mirror surface and use as a valve seat in dispensing oxygen and at high pressures even though the gas may be turned on suddenly in considerable volume whereas the following compositions burn under like conditions: hard rubber, Seran, (a thermal plastic resin) Bakelite, (a synthetic vinyl chloride). Most of these materials are plastic at high temperatures.

Moreover, nylon with little or no filler when used as a valve seat material does not deform to relieve internal stresses that otherwise cause a high magnitude of cold flow and creep when the valve is closed under high pressure.

Nylon is resistant to oils, greases, esters, ketones, alkalis, alcohols, common solvents and weak acids. It is affected by phenol formic acid and concentrated mineral acids. But some of its most surprising qualities and some of its highly desirable characteristics as regards use in valves or valve seats are a high initial resiliency, extreme firmness after any heavy initial forming pressures, greater capacity for absorbing foreign particles and great resistance to creep and cold flow at various temperatures between 25° F. and 300° F. and under high pressures. Under an initial load of 1500 pounds, for example, it was found that aluminum and nylon had a sustained high resistance, nylon in fact remaining substantially in its initial shape over a period of about twenty minutes. However, both hard rubber and white metal deformed to a considerable extent at the end of ten minutes. Under a load application of 4000 pounds the resistance to cold flow of nylon was much greater than hard rubber, far superior to white metal and not very much inferior to aluminum. However, the extreme hardness of aluminum and Bakelite resulted in an objectionable deformation of the valve port which was a difficulty entirely lacking with nylon. Nylon also has penetration resistance of an extent equal to aluminum and greater than any of the other materials suitable for valves except Bakelite, which was so hard that, as stated, it deformed the valve port.

Figure 2:
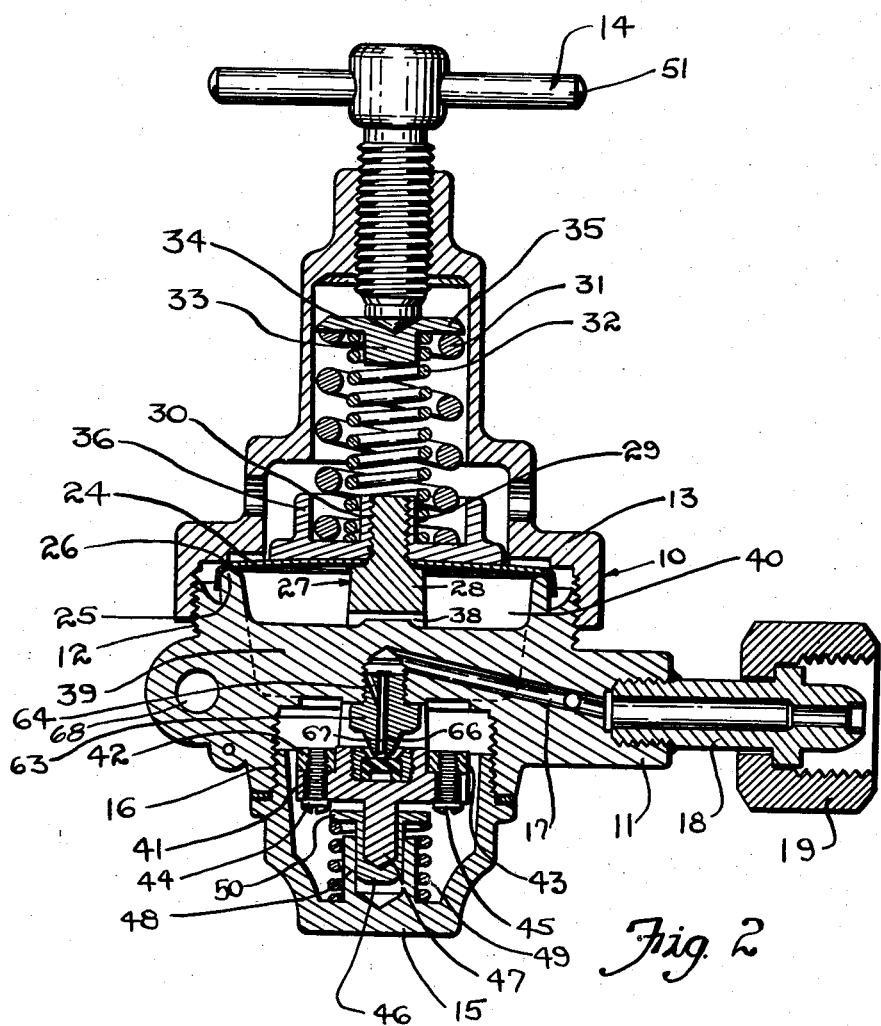
Fig. 2 is a vertical sectional view of the regulator shown in Fig. 1.

Referring now to Fig. 2, the reference character 10 designates a valve which is adapted to be used in controlling the flow of oxygen under high pressure storage conditions. For example, the oxygen may be stored at pressures up to 4000 pounds per square inch, and may be dispensed at pressures up to 400 pounds per square inch. The valve 10 comprises a body portion 11 having a threaded portion 12 for receiving thereon a bonnet 13 into which is threaded an adjusting screw 14. A back cap 15 is threadedly received in an internally threaded opening 16 of the body 11.

The body portion 11 is provided with an inlet conduit 17, which is connected by a pipe 18 with the assembly 19 suitable for further engagement with a storage tank (not shown) and an outlet 20 is provided for threaded connection with a suitable dispensing tube (not shown) at one end and to a gauge 21 indicating dispensing pressures at the other end. A gauge 22 for registering the pressures of the oxygen tank (not shown) is mounted in threaded engagement with the inlet as seen at 23.

A diaphragm 24 of rubber or other flexible material is held between shoulders 25 and 26 on the body portion 11 and the bonnet 13 respectively by means of the threaded engagement therebetween and a diaphragm and yoke assembly, referred to generally by numeral 27, is retained on the diaphragm 24 by means of a yoke 28 having a threaded end 29 engaging the annular boss 30 of the yoke assembly 27. The yoke assembly 27 is biased downwardly to counteract pressures introduced therebeneath (as will be hereinafter described) by means of a relatively heavy spring 31 and a relatively light spring 32 extending coaxially through spring 31 from annular boss 30 into centered engagement with a boss 33 on a spring button 34. Both the springs 31 and 32 bear against the circular flange 35 on the spring button. The springs are held against lateral movement on the yoke assembly 27 by means of a retaining wall 36 disposed peripherally therearound.

The yoke 28 is apertured centrally as at 38 to receive therethrough a bracket 39 formed integrally with the valve body 11. The valve body 11 is hollow internally to provide a chamber 40. The lower end of the yoke is fixedly secured to a centerpiece 41 by means of a pair of bracket arms 42 and 43 received in the centerpiece and secured thereto by screws 44 and 45. A centerpiece guide 46 receives a depending stud 47 of the centerpiece and is slidably mounted in an upstanding annular flange 48 formed integrally with the back cap 15. A spring 49 bears against the bottom of the back cap to bias the centerpiece upwardly by means of a flange 50 on the centerpiece guide. Accordingly, the centerpiece is mounted for movement in response to movement of the diaphragm 24, whose initial position may be adjusted by the adjusting screw assembly 14 and the handle 51 thereon.

Figure 3:
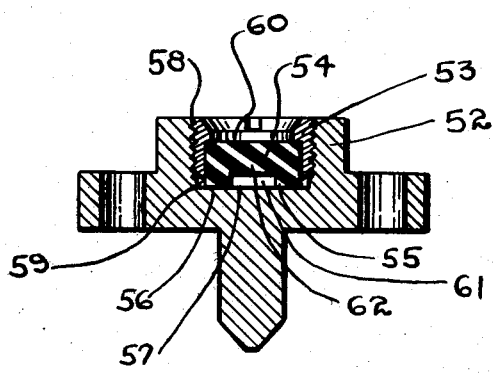
Fig. 3 is an enlarged fragmentary sectional view of the seat and centerpiece assembly of the invention.

As best seen in Fig. 3, the centerpiece assembly includes an annular flange 52 which is threaded internally to receive a seat-retaining screw 53. Accordingly, it is possible to retain a seat 54 of nylon axially in the centerpiece with any amount of force required.

The seat 54 sometimes referred to herein and in the claims as the valve seat disc has a novel cored construction defined by depending annular flange 55, whose lower face 56 bears against the bottom wall 57 of the recess 58 formed by the flange or retaining wall 52. The sidewall 59 of the seat is smooth and the top wall face 60 thereof is formed in parallel relationship to the wall 56 of the seat. Because of the chamber or recess 61 defined by the walls 55, the thickness of the central wall 62 of the seat is reduced substantially relative to the distance between the faces 56 and 60. The advantages of this construction will be hereinafter further described.

In order to reduce the hazard of igniting the valve seat (which is relatively safe to begin with because of its nylon construction) a nozzle 64 defines a bore 64 of reduced size which leads from the inlet passage 17 into an axial bore 66 in the nozzle 64. The passage 66 has centrally disposed therein a needle or pin 67 retained in a central upper portion thereof. This construction has been found superior to the ordinary open bore valve, which produces ignition in a relatively large number of instances when ordinary materials are used for the seat. The present nozzle construction has almost no such occurrences where ordinary materials are used.

The oxygen may thus be metered into the chamber 40 at a controlled rate and thence into the outlet passage 20 through the opening 68, without danger of damaging the valve or destroying its calibration.

Accordingly, there has been provided a nylon seat construction which by a reduced relative axial thickness in proportion to the diameter thereof permits a more resilient surface as well as resistance to very high gas pressures not heretofore available and affords resiliency in the annular flange 55 and top wall 60 for effective sealing action of the valve seat in use.

While the present invention has been explained and described with reference to certain principles and features, it is to be understood that the principles thereof are susceptible to considerable modification and variation. Accordingly it is not intended to be limited by illustrated examples in the accompanying drawings, or by the language in the foregoing description except as indicated in the appended claims.

We claim:

1. A molded nylon valve seat comprising a cylindrical main portion with a molded mirror finish flat top face and an annular flange on said main portion integrally formed therewith and defining a hollow core, said valve seat having a hardness substantially greater than that of untempered nylon and the minor dimension of the seat being approximately two-thirds of the overall diameter of the main portion of the seat with the radial thickness of the annular flange approximately one-half of the radius of the main portion.

2. A valve head centerpiece assembly comprising a carrier member having an internally threaded annular flange defining a recess having a flat bottom, a valve seat disposed in the recess comprising a cylindrical main portion having a flat front face with a mirror finish and an annular member integrally formed therewith extending marginally from the back to define a hollow core above the bottom of the recess and terminating in an annular flat supporting surface resting on the bottom of the recess, said main portion having a hardness in excess of 82 Shore D. and the radial thickness of the annular flange being approximately one-half the radius of the main portion, a seat retainer ring threaded into the annular flange having a wall telescoping over the valve seat and a radial flange engaging the margins of said front face under compressive force.

References Cited in the file of this patent

UNITED STATES PATENTS

| | | |
|---|---|---|
| 1,481,663 | Davis | Jan. 22, 1924 |
| 1,514,217 | Messer | Nov. 4, 1924 |
| 1,637,085 | Nichols | July 26, 1927 |
| 1,805,480 | Collins | May 19, 1931 |
| 2,309,729 | Gordon | Feb. 2, 1943 |
| 2,328,065 | Dreyfus | Aug. 31, 1943 |
| 2,344,657 | Thiel | Mar. 21, 1944 |
| 2,372,630 | Smith | Mar. 27, 1945 |
| 2,392,842 | Doell | Jan. 15, 1946 |
| 2,547,458 | Goodner | Apr. 3, 1951 |
| 2,650,456 | Mosier | Sept. 1, 1953 |
| 2,654,560 | Smith | Oct. 6, 1953 |
| 2,657,431 | Slaughter | Nov. 3, 1953 |
| 2,686,935 | Stott | Aug. 24, 1954 |